United States Patent
Golodetz et al.

(10) Patent No.: US 8,617,783 B2
(45) Date of Patent: Dec. 31, 2013

(54) ELECTROPHOTOGRAPHIC INK, LIQUID TONER PRODUCING METHODS, AND DIGITAL PRINTING METHODS

(75) Inventors: Galia Golodetz, Rehovot (IL); Gal Victor, Rehovot (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 13/384,481

(22) PCT Filed: Jul. 23, 2009

(86) PCT No.: PCT/EP2009/059482
§ 371 (c)(1),
(2), (4) Date: Jan. 17, 2012

(87) PCT Pub. No.: WO2011/009488
PCT Pub. Date: Jan. 27, 2011

(65) Prior Publication Data
US 2012/0114378 A1    May 10, 2012

(51) Int. Cl.
*G03G 9/00* (2006.01)
*G03G 13/10* (2006.01)

(52) U.S. Cl.
USPC ............... 430/123.52; 430/108.6; 430/114; 430/116; 430/118.6; 430/137.22

(58) Field of Classification Search
USPC ............ 430/108.6, 114, 116, 118.6, 137.22, 430/123.52
See application file for complete search history.

(56) References Cited

U.S. PATENT DOCUMENTS

| | | | |
|---|---|---|---|
| 5,607,808 A * | 3/1997 | Nishizawa et al. | 430/137.19 |
| 5,646,481 A | 7/1997 | Zovko | |
| 6,359,105 B1 | 3/2002 | Ianni et al. | |
| 6,841,329 B2 | 1/2005 | Nguyen et al. | |
| 7,208,036 B2 | 4/2007 | Fukuo et al. | |
| 7,217,743 B2 | 5/2007 | Kondo | |
| 7,279,511 B2 | 10/2007 | Zhu et al. | |
| 2003/0052952 A1 | 3/2003 | Tanabe et al. | |
| 2003/0149130 A1 | 8/2003 | Kondo | |
| 2004/0110868 A1 | 6/2004 | Zhu et al. | |
| 2004/0246319 A1 | 12/2004 | Ito et al. | |
| 2005/0282928 A1 | 12/2005 | Lin et al. | |
| 2006/0194138 A1 | 8/2006 | Regev et al. | |
| 2006/0275606 A1 | 12/2006 | Mizutani | |
| 2007/0093572 A1 | 4/2007 | Bhatt | |
| 2007/0105034 A1 | 5/2007 | Chatow et al. | |
| 2007/0191509 A1 | 8/2007 | Kobayashi | |
| 2007/0197684 A1 | 8/2007 | Yamashita et al. | |
| 2007/0259986 A1 | 11/2007 | Elwakil et al. | |
| 2008/0138530 A1 | 6/2008 | Lin et al. | |

FOREIGN PATENT DOCUMENTS

| | | |
|---|---|---|
| CN | 101454410 | 6/2009 |
| CN | 102056999 A | 5/2011 |
| EP | 1510559 | 3/2005 |
| JP | 2004-94178 | 3/2004 |
| WO | WO0153895 | 7/2001 |
| WO | WO03065126 | 8/2003 |

OTHER PUBLICATIONS

Dupont Material Safety Data Sheet, "Surlyn" Reflection Series, Supergloss Molding Alloys All in Synonym List SUR032, Revised Jul. 1, 2005, 1 page.
Dupont Material Safety Data Sheet, Surlyn SG201U, Dec. 9, 2003, 2 pages.
www2.dupont.coni/Surlynten_US, Surlyn Properties Grid—Industrial Grades, Sep. 2005, 2 pages.
Patent Abstract of JP10125466, May 15, 1998, Aoki at al.
Patent Abstract of JP11080641, Mar. 26, 1999, Shimonukuyu et al.
Patent Abstract of JP52038551, Mar. 25, 1977, Kimimura et al.
Patent Abstract of JP04146138, May 20, 1992, Sawara et al.
International Search Report and Written Opinion for PCT/EP2009/059482 dated Oct. 6, 2010 (11 pages).

* cited by examiner

*Primary Examiner* — Thorl Chea

(57) ABSTRACT

An ink contains dispersed particles, individually including at least one thermoplastic first resin exhibiting a MFI less than or equal to 100, at least one thermoplastic second resin exhibiting a MFI greater than 100, and a white pigment. A liquid toner producing method includes forming a paste containing the resins, combining the paste with a white pigment, and after combining the paste and pigment, applying a shear force, encapsulating the pigment, and dispersing the encapsulated pigment. A digital printing method includes providing a liquid marking agent containing charged particles dispersed in a carrier liquid, individual particles including at least one thermoplastic first resin and at least one thermoplastic second resin encapsulating a white pigment, and printing a hard image on a substrate. At least a portion of the image has a white color.

20 Claims, No Drawings

ELECTROPHOTOGRAPHIC INK, LIQUID TONER PRODUCING METHODS, AND DIGITAL PRINTING METHODS

BACKGROUND

Known liquid electrophotographic (LEP) presses generally use LEP ink containing charged particles to print images on various substrates. Since many substrates are white, providing only a few colors, such as cyan, magenta, yellow, and black (CMYK), allows printing black and white images, as well as a wide variety of color images that include white features. However, for printing on non-white substrates, or for other reasons, a white ink may be desirable. The most suitable white inks are significantly opaque, so as to hide underlying colors. Otherwise, a white feature of an image may acquire shades indicative of the underlying color. Since LEP inks may be printed as a relatively thin layer, about 1 micrometer (μm), providing sufficient opacity in a single printed layer has been a challenge.

DETAILED DESCRIPTION OF THE EMBODIMENTS

The physics behind providing a thin layer of opaque material, such as LEP ink, indicate that increasing opacity for a given layer thickness involves increasing the refraction of light by particles in the layer. In the context of the present document, opacity is the ratio of reflected light intensity to incident light intensity. Generally speaking, providing more surface area of refractive material increases opacity of the given layer thickness. In the case of white LEP ink, white pigment particles may constitute the major refractive material.

Supplying the type of charged particles useful in LEP presses may involve encapsulating pigment particles in resin on which ink additives may operate to provide the charge. A challenge in working with pigment particles involves re-agglomeration of pigment particles during the encapsulation process. The available surface area for the purposes of light refraction may become reduced from re-agglomeration compared to the potential surface area, which assumes all pigment particles are individually dispersed throughout the resin. The pigment re-agglomeration into larger particles encapsulated in the resin essentially reduces opacity of a printed layer that might otherwise be obtained if the pigment was more finely dispersed.

Although the discussion above is directed to LEP ink, the embodiments herein may be more broadly applicable. For that reason, references are made to a "marking agent," a generic term encompassing LEP ink, toner, and other substances. Similarly, although the discussion above is directed to pigments, the embodiments herein may be more broadly applicable. For that reason, references are made to a "coloring particle," a generic term encompassing pigments and other substances. Further, although the discussion above is directed to LEP presses, the embodiments herein may be more broadly applicable. For that reason, references are made to "forming a hard image," a generic term encompassing printing with a LEP press and other methods. Thus, the embodiments may involve using a marking agent containing a coloring particle to form a hard image, which encompasses using LEP ink or toner containing a pigment in a LEP press and other methods.

Unless otherwise specified herein, all references to melt flow index (MFI) are given in units of grams (g) per 10 minutes (min) (also, decigrams per min) at 190° C. using a weight of 2.16 kilograms (kg) pursuant to ASTM standard D1238. Essentially, the MFI test assesses the ability of a melted thermoplastic resin to flow under given temperature and load conditions. In the test, a specified amount of resin is placed in a dedicated device, which mimics an extruder with a defined capillary diameter and length. With the application of temperature and pressure, the resin melts and starts to flow. The amount of resin flowing out of the device for a specified length of time is measured. The higher the MFI, the more resin flowed out of the device. Consequently, a higher MFI resin flows more readily at a given temperature compared to a lower MFI resin.

In one embodiment, a marking agent includes a combination of a thermoplastic first resin exhibiting a MFI less than or equal to 100 g/10 min, a thermoplastic second resin exhibiting a MFI greater than 100 g/10 min, a hydrocarbon carrier liquid, and a white coloring particle. By way of example, the white coloring particle may be a white pigment, though other particles may be suitable. The first resin may include a plurality of resins that exhibit different melt flow indices and/or different chemical structures. The second resin may include a plurality of resins that exhibit different melt flow indices and/or different chemical structures.

Observation indicates that using second resin exhibiting MFI greater than 100 may allow better wetting of particle surfaces and better transfer of shearing forces during mixture of resin and coloring particles compared to using only first resin exhibiting MFI less than or equal to 100. The second resin can be described as more pliant, allowing increased dispersion of coloring particles throughout the resin. Without being limited to any particular theory, a belief exists that better wetting of particle surfaces allows more effective encapsulation of the particles with the more pliant second resin and may reduce re-agglomeration. Also, the increased transfer of shearing forces to coloring particles additionally may break up agglomerations of particles and/or break up individual particles into smaller particles. In turn, the more pliant second resin may more effectively encapsulate the smaller particles, also reducing re-agglomeration of those particles.

The better wetting and/or better transfer of shearing forces may thus reduce available particle size for the purpose of light refraction, as well as actual particle size. With the particle sizes reduced and individual particles dispersed throughout the resin, opacity of a layer printed using the coloring particles may increase compared to a layer lacking the second resin. For a white ink, the increased opacity may provide a printed layer sufficiently opaque for use as a single layer in LEP presses. A desirable marking agent may exhibit a property of producing a printed image having a white color and an increased opacity compared to the same image printed instead using a marking agent containing additional first resin instead of the second resin, but otherwise identical. The measured optical density (OD) may decrease by at least 0.02, representing a significant, visually noticeable difference in OD. For example, the desirable marking agent may exhibit at least a 10% increase in opacity. OD is related to opacity as $-\log_{10}$ (opacity). Consequently, as the value of opacity increases, the value of OD decreases.

Even so, the quality and productivity of printing processes, such as LEP printing, might depend on maintaining existing mechanical properties and/or charging properties of resin encapsulated particles dictated by a current resin, such as the first resin with MFI less than or equal to 100. Hence, an amount of the first resin sufficient to maintain mechanical and/or charging properties may be combined with an amount of second resin sufficient to enhance dispersion of coloring particles throughout the resin combination and/or to reduce available and/or actual particle size. At least 50 weight percent (wt %) resin with MFI less than or equal to 100 may be sufficient to maintain mechanical and/or charging properties. At least 10 wt % resin with MFI greater than 100 may be sufficient to enhance dispersion of coloring particles throughout the resin combination and/or to reduce available and/or actual particle size. Consequently, the at least one second resin may constitute from about 10 to about 50 wt % of all the resin, for example, from 20 to 25 wt %. Correspondingly, the at least one first resin may constitute from about 50 to about 90 wt % of all the resin, for example, from 75 to 80 wt %. Multiple first and/or second resins may be used to allow tuning of ink performance attributes, for example, to compensate for the use of resin with MFI greater than 100.

In another embodiment, a liquid electrophotographic ink includes a hydrocarbon carrier liquid, particles dispersed in the carrier, and additives configured to charge the particles. Individual particles contain at least one thermoplastic first resin exhibiting a MFI less than or equal to 100, at least one thermoplastic second resin exhibiting a MFI greater than 100, and a white pigment embedded into the resins.

By way of example, additives configured to charge the particles include known additives, such as charging agents, viscosity control agents, and other materials. Also, the carrier liquid may include known isoparaffinic, dielectric solvents and other solvents or carrier liquids useful in LEP and/or digital printing. Generally, to maintain a dielectric condition, marking agents used in LEP do not include water as part of the carrier liquid. Consequently, in an embodiment, all carrier liquid of a LEP ink may consist of a hydrocarbon, dielectric liquid.

The first resin may be selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof.

Similarly, the second resin may be selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof.

Notably, the first resin and the second resin may include the same polymerized monomer unit. Alternatively, the first resin and the second resin may include different polymerized monomer units. The monomer units may be the same since polymeric properties such as molecular weight, branching, percent acidity, etc. may be involved in determining MFI. Specifically, the prevalence of acid groups may affect the MFI of a particular polymer. As a result, for a given first resin proven suitable for a particular application, a second resin with MFI greater than 100, but including the same polymerized monomer units, may be used in combination. Such a combination of polymers of the same or similar backbone might be useful to reduce any side effects of changing the marking agent composition by using a second resin. The MFI of the second resin may be higher than 100, for example, greater than 200.

Although a variety of coloring particles may be used, the pigment may be selected from the group consisting of $TiO_2$, calcium carbonate, zinc oxide, and mixtures thereof, for example, the pigment may consist essentially of $TiO_2$. A form for the $TiO_2$ may be selected from among rutile, anatase, brookite, and mixtures thereof, for example, the form may consist of rutile. The rutile form of $TiO_2$ exhibits the highest refractive index among the other forms of $TiO_2$ and the other listed pigments. All other parameters of inks being the same, the highest refractive index yields the highest opacity. The marking agent may contain at least 1 wt % NVS coloring particle, for example, from 1 to 80 wt % NVS. "NVS" herein abbreviates the term "non-volatile solids," as considered by those of ordinary skill.

In an embodiment, a liquid toner producing method includes forming a paste containing a hydrocarbon carrier liquid and a combination of at least one thermoplastic first resin and at least one thermoplastic second resin. The first resin exhibits MFI and the second resin exhibits MFI that is greater than the first resin MFI. The method includes combining the paste with a white pigment and additional carrier liquid, the pigment exhibiting a particle size distribution having a median particle size. After combining the paste, pigment, and additional hydrocarbon carrier liquid, a shear force is applied. The method includes reducing the median particle size of the pigment, encapsulating the pigment in the combination of the first and second resin, and dispersing the encapsulated pigment in the combined carrier liquid and additional carrier liquid.

By way of example, the first resin MFI may less than or equal to 100. Reducing the median particle size of the pigment may further include breaking up the pigment particles and exposing new surfaces. Encapsulating the pigment in the combination of the first and second resin may include reducing re-agglomeration of the new surfaces.

In an embodiment, a digital printing method includes providing a liquid marking agent containing charged particles dispersed in a carrier liquid. Individual particles include at least one thermoplastic first resin and at least one thermoplastic second resin encapsulating a white pigment. The first resin exhibits MFI less than or equal to 100 and the second resin exhibits MFI greater than 100. By electrophotographic means, a hard image is printed on a substrate using the liquid marking agent. At least a portion of the image has a white color and exhibits an increased opacity compared to the same image printed instead using a marking agent containing additional first resin instead of the second resin, but otherwise identical.

These and other benefits may be further appreciated from the Examples below illustrating various embodiments.

EXAMPLE 1

A paste as a 30% NVS solution was prepared from Nucrel 960 resin with MFI=60 (copolymer of ethylene and methacrylic acid available from E.I. du Pont de Nemours and Company, Inc. in Wilmington, Del.) and Isopar L (isoparaffinic solvent available from ExxonMobil Chemical in Houston, Tex.). The ingredients were placed in a double planetary mixer, heated to a temperature of 120 to 160° C., and mixed for 1.5 hours. After that time, the heating was stopped and mixing continued until the ingredients reached room temperature. The resulting paste was then placed in the ceramic-lined tank of a 1-S ATTRITOR batch grinding mill available from Union Process Co. (Akron, Ohio) in 1:1 weight ratio (based on solids) with a $TiO_2$ rutile form pigment, sufficient additives configured to form a LEP ink, and Isopar L to give 18 wt % NVS in the mill, of which 9 wt % NVS was pigment.

After grinding for 3 hours at 45° C. then 9 hours at 40° C., the resulting white ink was diluted with Isopar L to a working solution of 3 wt % NVS and printed on a black ink layer using a WS6000 Digital Press available from HP-Indigo in Rehovot, Israel. An optical density (OD) of 1.17 for the printed image was determined using a 518 Spectrodensitometer available from X-Rite in Grand Rapids, Mich.

EXAMPLE 2

Example 1 was repeated by replacing 20 wt % of the Nucrel 960 resin with Nucrel 599 resin with MFI=500 (copolymer of ethylene and methacrylic acid available from E.I. du Pont de Nemours and Company, Inc. in Wilmington, Del.). A paste as a 30% NVS solution was prepared as in Example 1 with the 80 wt % Nucrel 960/20% wt % Nucrel 599 mixture. A white ink was prepared, analyzed as in Example 1, and produced an optical density of 1.05.

The invention claimed is:

1. A liquid electrophotographic ink, comprising:
   a hydrocarbon carrier liquid;
   particles dispersed in the carrier, individual particles containing:
      at least one thermoplastic first resin exhibiting a melt flow index (MFI) less than or equal to 100 g/10 min;
      at least one thermoplastic second resin exhibiting a MFI greater than 100 g/10 min; and
      a white pigment embedded into the first thermoplastic resin and the second thermoplastic resin; and
   particle charging agents.

2. The liquid electrophotographic ink of claim 1 wherein the carrier liquid comprises an isoparaffinic, dielectric solvent.

3. The liquid electrophotographic ink of claim 1 wherein the first resin is selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof.

4. The liquid electrophotographic ink of claim 1 wherein the second resin is selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof.

5. The liquid electrophotographic ink of claim 1 wherein the first resin and the second resin comprise the same polymerized monomer unit.

6. The liquid electrophotographic ink of claim 1 wherein the second resin exhibits MFI greater than 200 g/10 min.

7. The liquid electrophotographic ink of claim 1 wherein each of the first resin and the second resin independently comprises a plurality of resins that exhibit: different melt flow indices and different chemical structures; or different melt flow indices or different chemical structures.

8. The liquid electrophotographic ink of claim 1 wherein a total of all resin in the ink comprises from about 10 wt % to about 50 wt % second resin and from about 50 wt % to about 90 wt % first resin.

9. The liquid electrophotographic ink of claim 1 wherein the pigment comprises $TiO_2$.

10. The liquid electrophotographic ink of claim 1 wherein the ink exhibits a property of producing a printed image having a white color and an increased opacity compared to an other printed image printed using an other liquid electrophotographic ink containing additional first resin instead of the second resin.

11. The liquid electrophotographic ink of claim 10 wherein the ink exhibits at least a 10% increase in opacity as compared to an opacity exhibited by the other liquid electrophotographic ink.

12. A printed sheet comprising an image containing the particles of claim 1.

13. A liquid toner producing method, comprising:
   forming a paste containing a hydrocarbon carrier liquid and a combination of at least one thermoplastic first resin and at least one thermoplastic second resin, the first resin exhibiting a melt flow index (MFI) and the second resin exhibiting a MFI that is greater than the first resin MFI;
   combining the paste with a white pigment and additional carrier liquid, the pigment exhibiting a particle size distribution having a median particle size; and
   after combining the paste, pigment, and additional hydrocarbon carrier liquid, applying a shear force, reducing the median particle size of the pigment, encapsulating the pigment in the combination of the first and second resin, and dispersing the encapsulated pigment in the combined carrier liquid and additional carrier liquid.

14. The method of claim 13 wherein reducing the median particle size of the pigment further includes breaking up pigment particles and exposing new surfaces and encapsulating the pigment in the combination of the first and second resin includes reducing re-agglomeration of the new surfaces.

15. The method of claim 13 wherein:
   the first resin is selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof; and
   the second resin is selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof.

16. The method of claim 13 wherein each of the first resin and the second resin independently comprises a plurality of resins that exhibit: different melt flow indices and different chemical structures; or different melt flow indices or different chemical structures.

17. The method of claim 13 wherein the toner exhibits a property of producing a printed image having a white color and an increased opacity compared to the same image printed instead using a toner containing additional first resin instead of the second resin, but otherwise identical.

18. A digital printing method, comprising:

providing a liquid marking agent containing charged particles dispersed in a carrier liquid, individual particles including at least one thermoplastic first resin and at least one thermoplastic second resin, the first thermoplastic resin and second thermoplastic resin encapsulating a white pigment, the first resin exhibiting a melt flow index (MFI) less than or equal to 100 g/10 min, and the second resin exhibiting a MFI greater than 100 g/10 min; and printing a hard image on a substrate using the liquid marking agent, at least a portion of the image having a white color and exhibiting an increased opacity compared to an other hard image printed instead using an other liquid marking agent containing additional first resin instead of the second resin.

19. The method of claim 18 wherein:

the first resin is selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof; and the second resin is selected from the group consisting of copolymers of ethylene and methacrylic acid, metal salts of copolymers of ethylene and methacrylic acid, copolymers of acrylic acid and methacrylic acid, acid-modified ethylene acrylate copolymer, copolymers of ethylene and glycidyl methacrylate (E-GMA), terpolymers of ethylene, methyl acrylate, and glycidyl methacrylate (E-MA-GMA), terpolymers of ethylene, ethyl acrylate, and maleic anhydride, and mixtures thereof.

20. The method of claim 18 wherein the marking agent exhibits at least a 10% increase in opacity as compared to an opacity exhibited by the other liquid marking agent.

* * * * *

UNITED STATES PATENT AND TRADEMARK OFFICE
CERTIFICATE OF CORRECTION

| | | |
|---|---|---|
| PATENT NO. | : 8,617,783 B2 | Page 1 of 1 |
| APPLICATION NO. | : 13/384481 | |
| DATED | : December 31, 2013 | |
| INVENTOR(S) | : Golodetz et al. | |

It is certified that error appears in the above-identified patent and that said Letters Patent is hereby corrected as shown below:

In the Claims

Column 7, line 14, in Claim 18, after "printed" delete "instead".

Signed and Sealed this
Twentieth Day of May, 2014

Michelle K. Lee
*Deputy Director of the United States Patent and Trademark Office*